(12) United States Patent
Matayoshi et al.

(10) Patent No.: US 10,059,162 B2
(45) Date of Patent: Aug. 28, 2018

(54) UNSPRUNG POWER SUPPLY APPARATUS FOR IN-WHEEL MOTOR VEHICLE

(71) Applicant: Nissan Motor Co., Ltd., Yokohama-shi, Kanagawa (JP)

(72) Inventors: Yutaka Matayoshi, Kanagawa (JP); Sakiko Suzuki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/314,998

(22) PCT Filed: Apr. 7, 2015

(86) PCT No.: PCT/JP2015/060838
§ 371 (c)(1),
(2) Date: Nov. 30, 2016

(87) PCT Pub. No.: WO2015/198679
PCT Pub. Date: Dec. 30, 2015

(65) Prior Publication Data
US 2017/0190229 A1 Jul. 6, 2017

(30) Foreign Application Priority Data
Jun. 27, 2014 (JP) .................................. 2014-133315

(51) Int. Cl.
*B60K 7/00* (2006.01)
*B60G 3/20* (2006.01)
(Continued)

(52) U.S. Cl.
CPC ............... *B60G 3/20* (2013.01); *B60K 7/00* (2013.01); *B60L 11/18* (2013.01); *B60R 16/02* (2013.01); *B60G 2204/202* (2013.01)

(58) Field of Classification Search
CPC ........................... B60K 7/0007; B60K 7/0038
(Continued)

(56) References Cited

U.S. PATENT DOCUMENTS 3,163,250 A * 12/1964 Gibson ............... B60K 17/046
180/253
3,566,165 A * 2/1971 Lohr .................... B60K 7/0007
105/53

(Continued)

FOREIGN PATENT DOCUMENTS

JP 3-112724 A 5/1991
JP 2005-329910 A 12/2005
(Continued)

*Primary Examiner* — Jeffrey J Restifo
(74) *Attorney, Agent, or Firm* — Global IP Counselors, LLP

(57) ABSTRACT

An unsprung power supply apparatus is provided for an in-wheel motor vehicle. The unsprung power supply apparatus includes a steering knuckle, an in-wheel motor and a third link. The steering knuckle is configured to turn and steer a tire of the in-wheel motor vehicle. A virtual kingpin axis is an axis passing through a knuckle side coupling point at which the third link couples with the steering knuckle. In the unsprung power supply apparatus, a power supply cable connects the in-wheel motor and a power supply unit with a part of the power supply cable on a vehicle body side being fixed to the third link.

8 Claims, 10 Drawing Sheets

(51) Int. Cl.
  *B60L 11/18*      (2006.01)
  *B60R 16/02*      (2006.01)
(58) Field of Classification Search
  USPC .................................................. 180/65.51
  See application file for complete search history.

(56) References Cited

U.S. PATENT DOCUMENTS

| | | | | |
|---|---|---|---|---|
| 4,913,258 | A * | 4/1990 | Sakurai | B60K 7/0007 180/242 |
| 5,087,229 | A * | 2/1992 | Hewko | B60K 7/0007 180/65.51 |
| 5,150,763 | A * | 9/1992 | Yamashita | B60K 7/0007 180/242 |
| 5,327,034 | A * | 7/1994 | Couture | B60K 7/0007 310/64 |
| 5,542,492 | A * | 8/1996 | Kasper | B60G 3/01 180/253 |
| 7,597,169 | B2 * | 10/2009 | Borroni-Bird | B60G 3/18 180/253 |
| 8,746,383 | B2 * | 6/2014 | Basadzishvili | B60G 3/01 180/65.51 |
| 2003/0083797 | A1 * | 5/2003 | Yokoyama | B60T 13/741 701/70 |
| 2004/0080223 | A1 * | 4/2004 | Shimizu | B60K 7/0007 310/75 C |
| 2006/0219449 | A1 * | 10/2006 | Mizutani | H02K 9/19 180/65.51 |
| 2006/0225931 | A1 * | 10/2006 | Kurata | B60K 7/0007 180/65.51 |
| 2007/0199748 | A1 * | 8/2007 | Ross, VII | B60G 3/20 180/65.51 |
| 2008/0093133 | A1 * | 4/2008 | Yogo | B60G 3/20 180/55 |
| 2008/0257620 | A1 * | 10/2008 | Poulsen | B60K 6/26 180/65.51 |
| 2009/0166111 | A1 * | 7/2009 | Mizutani | B60K 7/0007 180/65.51 |
| 2010/0163323 | A1 * | 7/2010 | Pickholz | B60K 7/0007 180/65.51 |
| 2010/0320852 | A1 * | 12/2010 | Isogai | H02K 5/225 310/71 |
| 2010/0320853 | A1 * | 12/2010 | Isogai | H02K 5/225 310/71 |
| 2011/0011656 | A1 * | 1/2011 | Poulsen | B60K 6/26 180/65.25 |
| 2011/0180336 | A1 * | 7/2011 | Kurata | B60L 11/1812 180/65.1 |
| 2014/0190741 | A1 * | 7/2014 | Hayakawa | B60R 16/0215 174/72 A |
| 2015/0061440 | A1 * | 3/2015 | Catalan | B60K 7/00 310/154.01 |
| 2016/0176369 | A1 * | 6/2016 | Ito | B60R 16/023 174/72 A |
| 2016/0221432 | A1 * | 8/2016 | Tamura | B60G 3/20 |
| 2017/0190229 | A1 * | 7/2017 | Matayoshi | B60G 3/20 |

FOREIGN PATENT DOCUMENTS

| | | |
|---|---|---|
| JP | 2008-1241 A | 1/2008 |
| JP | 2008-308033 A | 12/2008 |
| JP | 2013-112003 A | 6/2013 |
| JP | 2013-144509 A | 7/2013 |
| JP | 2013-147084 A | 8/2013 |
| JP | 2013-159224 A | 8/2013 |

* cited by examiner

CROSS SECTION A-A

CROSS SECTION A-A (STEERING)

CROSS SECTION A-A

CROSS SECTION A-A (STEERING)

UNSPRUNG POWER SUPPLY APPARATUS FOR IN-WHEEL MOTOR VEHICLE

CROSS-REFERENCE TO RELATED APPLICATIONS

This application is a U.S. National stage application of International Application No. PCT/JP2015/060838, filed Apr. 7, 2015, which claims priority to JP Patent Application No. 2014-133315 filed on Jun. 27, 2014, the contents of which are hereby incorporated herein by reference.

BACKGROUND

Field of the Invention

The present invention relates to an unsprung power supply apparatus for an in-wheel motor vehicle in which a steering knuckle for steering a tire in the in-wheel motor vehicle is provided with an in-wheel motor and a third link, and a virtual kingpin axis is an axis passing through a coupling point at which the third link couples with the steering knuckle.

Background Information

Conventionally, an unsprung power supply apparatus for an in-wheel motor vehicle in which wiring and/or piping for a wheel motor penetrates through a pivot shaft that is fixed to a case of the in-wheel motor is known (for example, Japanese Laid-Open Patent Application No. 1991-112724).

SUMMARY

A conventional apparatus is structured such that the pivot shaft corresponding to the kingpin axis is hollow and through which extends high-voltage electrical power lines. Consequently, there is the problem that a special structure for wiring high-voltage electrical power lines is required, making the structure complex.

In view of the problems described above, an object of the present invention is to provide an unsprung power supply apparatus for an in-wheel motor vehicle, with which it is possible to decrease a space where a power supply cable for an in-wheel motor swings, while keeping a simple structure.

In order to achieve the object described above, in the unsprung power supply apparatus for an in-wheel motor vehicle of the present invention, a steering knuckle for steering a tire that is provided with an in-wheel motor, and a third link, as a virtual king pin axis, which has an axis that passes through a coupling point with the steering knuckle. In the in-wheel motor vehicle, part of a power supply cable that connects the in-wheel motor and the vehicle body-side power supply unit for wiring is fixed to the third link.

Therefore, part of the power supply cable that connects the in-wheel motor and the vehicle body-side power supply unit for wiring is fixed to the third link. That is, the third link is a non-rotating link member and a virtual kingpin axis (steering rotational axis) is an axis passing through a coupling point at which the third link couples with the steering knuckle. Accordingly, the power supply cable is split into a vehicle body-side power supply cable and a motor-side power supply cable, at the fixing position to the third link. Then, the vehicle body-side power supply cable needs only to accommodate vertical movement caused by bounding/rebounding, and the motor-side power supply cable needs only to accommodate the rotational movement caused by tire steering; thus, the motion absorption functions are divided. Therefore, compared to determining the total length of the power supply cable so as to accommodate the combined motion of the vertical movement and the rotational movement, it is possible to shorten the total length of the power supply cable and to decrease the space (dead space) in which the cable swings. As a result, the space where a power supply cable for an in-wheel motor swings can be decreased, while keeping a simple structure in which a part of the power supply cable is simply fixed to the third link.

BRIEF DESCRIPTION OF THE DRAWINGS

Referring now to the drawings which form a part of this original disclosure.

DETAILED DESCRIPTION OF THE EMBODIMENTS

Figure 1:
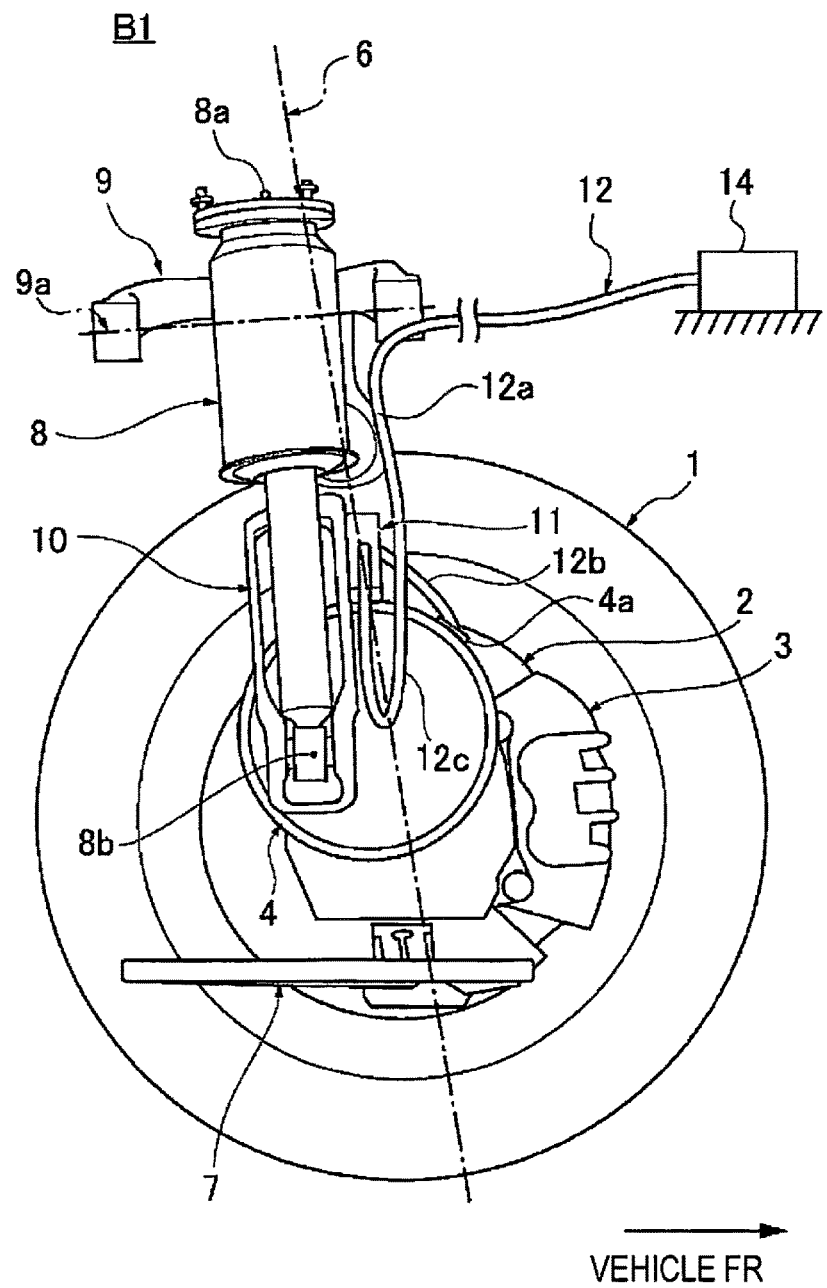
FIG. 1 is a side view illustrating a state in which the unsprung power supply apparatus for an in-wheel motor vehicle of a first embodiment is viewed from an inner side of the wheel.

Preferred embodiments for realizing an unsprung power supply apparatus for an in-wheel motor vehicle of the present invention will be described below based on the first to the fourth embodiments illustrated in the drawings.

First Embodiment

Figure 2:
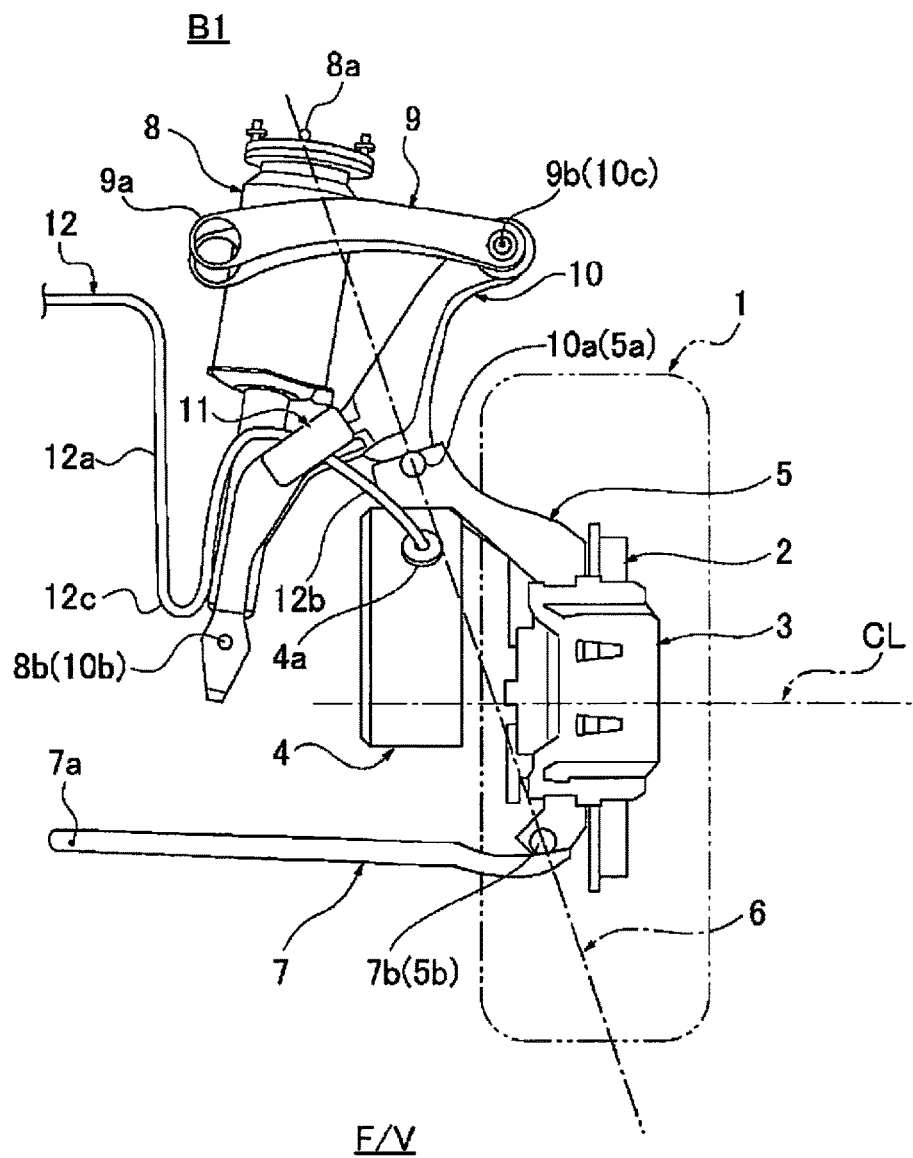
FIG. 2 is a front view illustrating a state in which the unsprung power supply apparatus for an in-wheel motor vehicle of the first embodiment is viewed from a front of the wheel.

FIG. 1 and FIG. 2 illustrate a state in which an unsprung power supply apparatus B1 for an in-wheel motor vehicle of the first embodiment is viewed from the inner side of the wheel and from the front of the wheel. The configuration of the unsprung power supply apparatus B1 for an in-wheel motor vehicle will be described below, based on FIG. 1 and FIG. 2.

An in-wheel motor vehicle to which is applied the above-described unsprung power supply apparatus B1 comprises a tire 1, a brake disk 2, a brake caliper 3, an in-wheel motor 4, a steering knuckle 5, a virtual kingpin axis 6, a lower link 7, a shock absorber 8, an upper link 9, and a third link 10, as illustrated in FIG. 1 and FIG. 2. That is, the steering knuckle 5 is provided for turning a tire 1, and is provided with the in-wheel motor 4 and the third link 10 such that the virtual kingpin axis 6 is an axis passing through a knuckle side coupling point 10a at which is coupled to the steering knuckle 5.

The virtual kingpin axis 6 described above is a virtual axis that connects a knuckle side coupling point 10a (i.e., an upper end of the steering knuckle 5a) of the third link 10 and the steering knuckle 5, and a motor-side pivot point 7b (i.e., a lower end of the steering knuckle 5b) of the lower link 7. The tire 1 is steered around the virtual kingpin axis 6 by a steering mechanism, such as a tie rod, which is not shown.

The tire 1 is incorporated on a wheel, which is not shown, and the brake disc 2 as well as the steering knuckle 5, and the in-wheel motor 4 via a hub, which is not shown, are incorporated in the wheel along a wheel axis CL.

The lower link 7 is a first suspension link member that connects the vehicle body and the steering knuckle 5 on the lower side of the wheel axis CL. This lower link 7 incorporates a vehicle body-side pivot shaft 7a so as to be pivotable with respect to the vehicle body, which is not shown, and incorporates the motor-side pivot point 7b on the other end so as to be rotatable with respect to the knuckle lower end 5b of the steering knuckle 5.

The shock absorber 8 is a strut structure in which a shock absorber and a coil spring are coaxially arranged, and is a suspension member that is supported on the vehicle body while buffering the force that is received in the vertical direction of the vehicle. The shock absorber 8 elastically supports an upper end 8a of the shock absorber with respect to the vehicle body, which is not shown, and incorporates a lower end 8b of the shock absorber shaft so as to be pivotable with respect to the shaft-side coupling point 10b of the third link 10.

The upper link 9 is a second suspension link member that connects the vehicle body and the third link 10 on the upper side of the wheel axis CL. This upper link 9 incorporates the vehicle body-side pivot shaft 9a so as to be pivotable with respect to a vehicle body side member, which is not shown, and incorporates a third link-side pivot point 9b on the other end so as to be pivotable with respect to a link-side coupling point 10c of the third link 10.

The third link 10 is a third suspension link member that connects the upper link 9 and the steering knuckle 5. The third link 10 incorporates the knuckle-side coupling point 10a so as to be rotatable with respect to the steering knuckle 5 around the virtual kingpin axis 6. The third link further incorporates the shaft-side coupling point 10b so as to be pivotable with respect to the shock absorber shaft lower end 8b of the shock absorber 8, and incorporates the link-side coupling point 10c so as to be pivotable with respect to the third link-side pivot point 9b of the upper link 9.

The unsprung power supply apparatus B1 comprises a power supply cable fixing member 11 and a power supply cable 12, as illustrated in FIG. 1 and FIG. 2. Then, part of the power supply cable 12 that connects the in-wheel motor 4 and the vehicle body side power supply unit 14 for wiring is fixed to the third link 10, by the power supply cable fixing member 11.

The power supply cable 12 is split into a vehicle body-side power supply cable 12a and a motor-side power supply cable 12b, at the fixing position to the third link 10. Then, the vehicle body-side power supply cable 12a is provided with a slack 12c in the power supply cable as play that accommodates the vertical movement caused by bounding/rebounding. The motor-side power supply cable 12b is only provided with the minimum play in the power supply cable, with which it is possible to mainly accommodate the rotational movement by steering the tire, and connects the end portion of the motor-side power supply cable 12b to the motor power supply terminal 4a of the in-wheel motor 4.

When the tire 1 is steered around the virtual kingpin axis 6, the steering knuckle 5, the in-wheel motor 4, and the motor-side power supply cable 12b are integrally steered together therewith. In addition, each part incorporated in the upper link 9 and the lower link 7 carries out bounding and rebounding within a set range of the shock absorber 8, with the vehicle body-side pivot shaft 9a and the vehicle body-side pivot shaft 7a as axes of the pivoting movement.

Next, the actions are described.

The first embodiment is configured such that a part of the power supply cable 12 that connects the in-wheel motor 4 and the vehicle body-side power supply unit 14 for wiring is fixed to the third link 10.

That is, the third link 10 is highly rigid, and also is a non-rotating link member that is coupled with the steering knuckle 5 such that the virtual kingpin axis 6 (steering rotational axis), passes through the knuckle side coupling point 10a. Accordingly, the power supply cable 12 that is fixed to the third link 10 is split into the vehicle body-side power supply cable 12a and the motor-side power supply cable 12b, at the fixing position to the third link 10. Further, there is basically only a vertical movement accompanying bounding/rebounding on the side with the vehicle body-side power supply cable 12a, and there is no rotational movement during steering. On the other hand, there is basically only a rotational movement during steering on the side with the motor-side power supply cable 12b, and there is no vertical movement, even if there is bounding/rebounding.

Accordingly, the vehicle body-side power supply cable 12a needs only to accommodate the vertical movement caused by bounding/rebounding, and the motor-side power supply cable 12b needs only to accommodate the rotational movement caused by tire steering; thus, the motion absorption functions are divided. That is, the vehicle body-side power supply cable 12a is provided with slack 12c in the power supply cable as play that accommodates the vertical movement, and the motor-side power supply cable 12b is only provided with minimum play with which it is possible to accommodate the rotational movement.

Therefore, during bounding/rebounding, since only the power supply cable slack 12c of the vehicle body-side power supply cable 12a changes shape and is displaced in the vertical direction of the vehicle, the space where the power supply cable swings is a narrow space defined by simply expanding the power supply cable slack 12c in the vertical direction. Additionally, during steering, since the motor-side power supply cable 12b is torsionally displaced according to the steering angle, the space where the power supply cable swings is a limited narrow space surrounding the motor-side power supply cable 12b. In the same manner, even if bounding/rebounding and steering overlap each other, the vehicle body-side power supply cable 12a accommodates the vertical movement and the motor-side power supply cable 12b accommodates the rotational movement, displaying a movement absorption action by division of functions.

In this manner, in the power supply cable 12, the movement accommodating functions are divided between the vehicle body-side power supply cable 12a and the motor-side power supply cable 12b. Accordingly, compared with determining the total length of the power supply cable so as to accommodate the combined motion of the vertical movement and the rotational movement, it is possible to shorten the total length of the power supply cable 12 and to decrease the space (dead space) in which the cable swings. As a result, the space where the power supply cable 12 for an in-wheel motor 4 swings can be decreased while keeping a simple structure, in which a part of the power supply cable 12 is simply fixed to the third link 10 by the power supply cable fixing member 11.

Next, the effects are described. In the unsprung power supply apparatus B1 for an in-wheel motor vehicle according to the first embodiment, the following effects can be achieved:

(1) In an in-wheel motor vehicle, a steering knuckle 5 for turning a tire 1 is provided with an in-wheel motor 4 and a third link 10, and a virtual king-pin axis 6 is an axis passing through a coupling point (knuckle side coupling point 10a) at which the steering knuckle 5 is coupled; and the power supply cable 12 connecting the in-wheel motor 4 and a vehicle body-side power supply unit 14 for wiring, with a part being fixed to the third link 10 (FIGS. 1 and 2). Accordingly, it is possible to decrease the space where the power supply cable 12 for an in-wheel motor 4 swings while keeping a simple structure.

Second Embodiment

The second embodiment is an example in which the fixing position of the power supply cable to the third link is defined in a position in the vicinity of the virtual kingpin axis.

Figure 3:
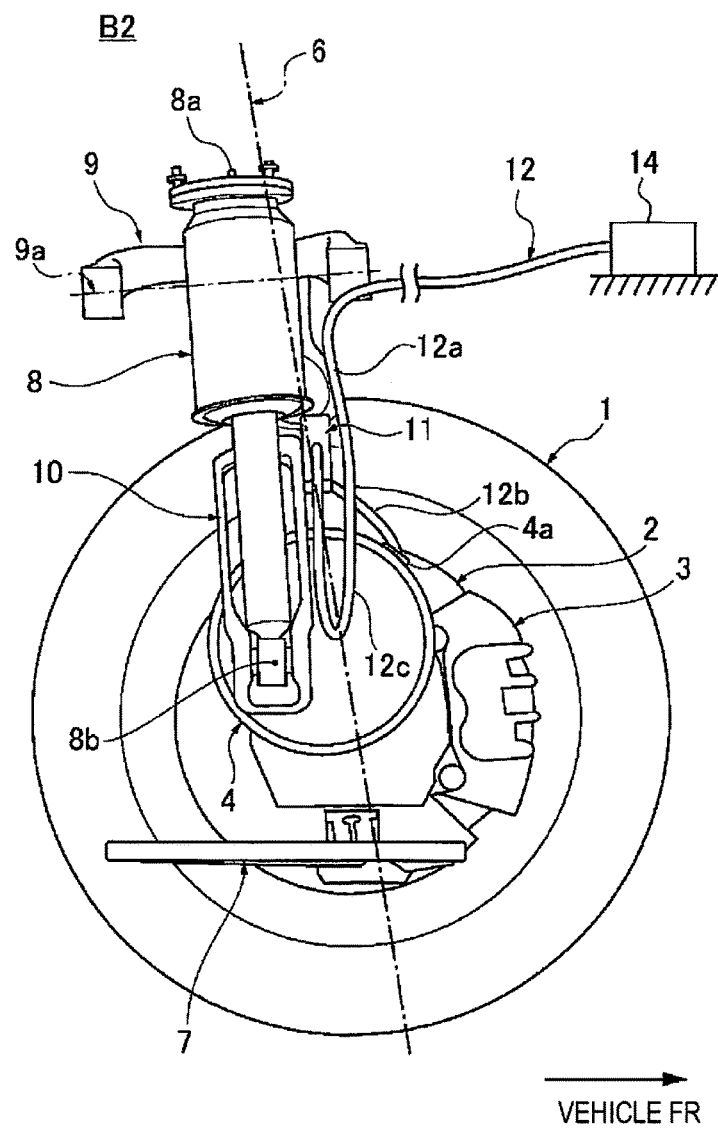
FIG. 3 is a side view illustrating a state in which the unsprung power supply apparatus for an in-wheel motor vehicle of a second embodiment is viewed from an inner side of the wheel.
Figure 4:
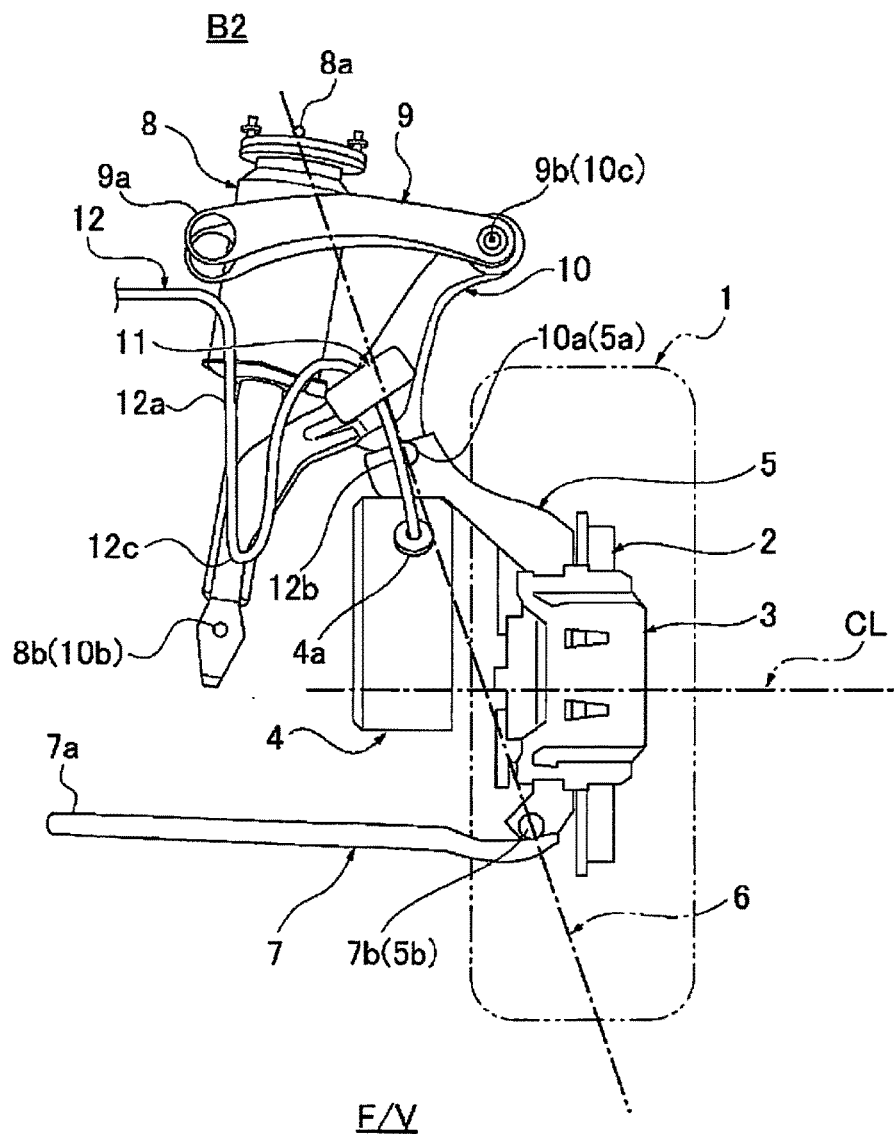
FIG. 4 is a front view illustrating a state in which the unsprung power supply apparatus for an in-wheel motor vehicle of the second embodiment is viewed from a front of the wheel.

FIG. 3 and FIG. 4 illustrate a state in which the unsprung power supply apparatus B2 for an in-wheel motor vehicle of the second embodiment is viewed from the inner side of the wheel and from the front of the wheel. The configuration and the action of the unsprung power supply apparatus B2 for an in-wheel motor vehicle will be described below, based on FIG. 3 and FIG. 4.

An in-wheel motor vehicle to which is applied the above-described unsprung power supply apparatus B2 comprises the tire 1, the brake disk 2, the brake caliper 3, the in-wheel motor 4, the steering knuckle 5, the virtual kingpin axis 6, the lower link 7, the shock absorber 8, the upper link 9, and the third link 10, as illustrated in FIG. 3 and FIG. 4.

The unsprung power supply apparatus B2 comprises the power supply cable fixing member 11 and the power supply cable 12, as illustrated in FIG. 3 and FIG. 4. The part of the power supply cable 12 that connects the in-wheel motor 4 and the vehicle body-side power supply unit 14 for wiring, is fixed on the third link 10 at a position in the vicinity of the virtual kingpin axis 6 on the third link 10. That is, when viewed from the front, the power supply cable fixing member 11 is provided at a position that overlaps the virtual kingpin axis 6 on an outer side position of the third link 10, as illustrated in FIG. 4. The position in the vicinity of the virtual kingpin axis 6 includes a position that coincides with the virtual kingpin axis 6, and a position in which the distance from the virtual kingpin axis 6 is within the range of a set distance.

In this manner, the second embodiment is configured such that, when a part of the power supply cable 12 that connects the in-wheel motor 4 and the vehicle body-side power supply unit 14 for wiring is fixed to the third link 10, the power supply cable is fixed in a position in the vicinity of the virtual kingpin axis 6. Accordingly, the amount of change of the relative position of the power supply cable fixing member 11 that is fixed to the in-wheel motor 4 and the third link 10 is reduced during steering, and the wiring of the motor-side power supply cable 12b can be arranged in a compact manner. The other configurations and actions are the same as in the first embodiment, so the descriptions thereof are omitted.

Next, the effects are described. In the unsprung power supply apparatus B2 for an in-wheel motor vehicle according to the second embodiment, the following effects can be achieved:

(2) The part of the power supply cable 12 for wiring is fixed to the third link 10 in a position in a vicinity of the virtual kingpin axis 6 (FIG. 4). Accordingly, in addition to the effect of (1), compared to the case in which the power supply cable is fixed in a position of the third link 10 away from the virtual kingpin axis 6, the wiring of the motor-side power supply cable 12b can be arranged in a compact manner.

Third Embodiment

The third embodiment is an example in which the fixing positions to the third link are defined when wiring two or more power supply cables.

Figure 5:
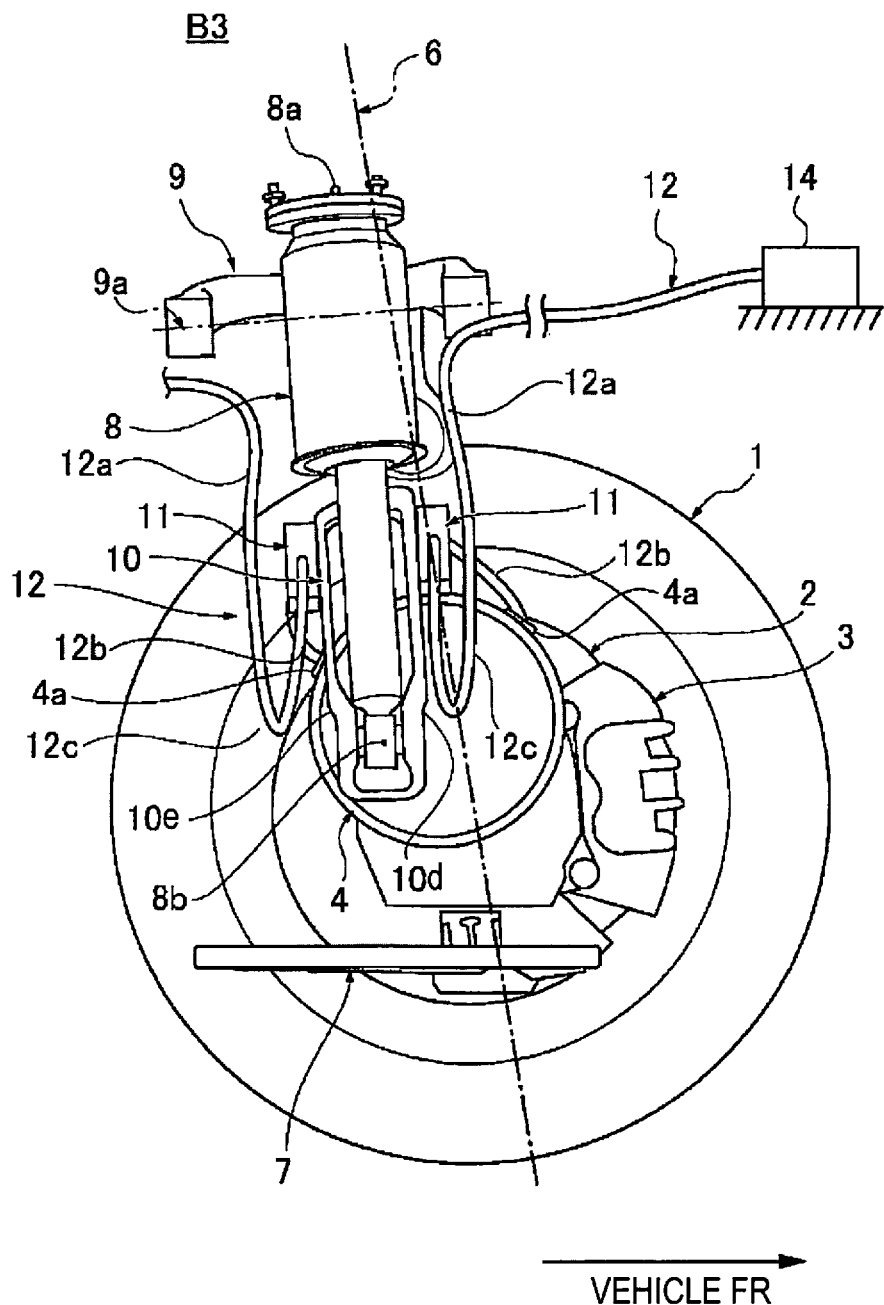
FIG. 5 is a side view illustrating a state in which the unsprung power supply apparatus for an in-wheel motor vehicle of a third embodiment is viewed from an inner side of the wheel.
Figure 6:
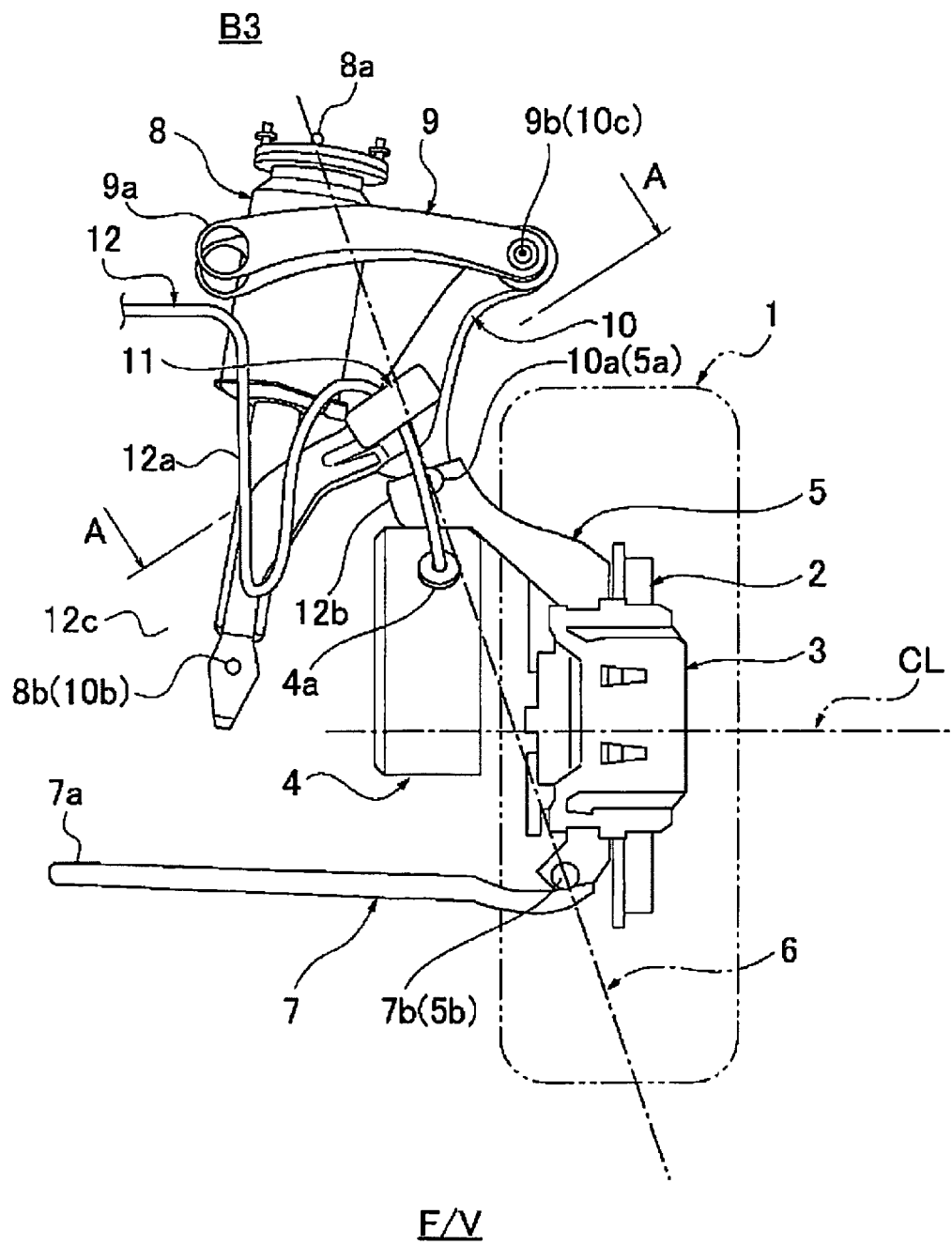
FIG. 6 is a front view illustrating a state in which the unsprung power supply apparatus for an in-wheel motor vehicle of the third embodiment is viewed from a front of the wheel.

FIG. 5 and FIG. 6 illustrate a state in which the unsprung power supply apparatus B3 for an in-wheel motor vehicle of the third embodiment is viewed from the inner side of the wheel and from the front of the wheel. The configuration and the action of the unsprung power supply apparatus B3 for an in-wheel motor vehicle will be described below, based on FIG. 5 and FIG. 6. The configuration is described.

The in-wheel motor vehicle to which is applied the above-described unsprung power supply apparatus B3 comprises the tire 1, the brake disk 2, the brake caliper 3, the in-wheel motor 4, the steering knuckle 5, the virtual kingpin axis 6, the lower link 7, the shock absorber 8, the upper link 9 and the third link 10, as illustrated in FIG. 5 and FIG. 6.

The third link 10 supports the lower end of the shock absorber 8 at the shaft-side coupling point 10b, which is in a position that is further on the vehicle body-side than the knuckle side coupling point 10a, as illustrated in FIG. 5. The third link is further configured to comprise a front link portion 10d and a rear link portion 10e so as to sandwich the shock absorber 8 in the longitudinal direction of the vehicle.

The unsprung power supply apparatus B3 described above comprises two power supply cable fixing members 11, and two power supply cables 12, as illustrated in FIG. 5 and FIG. 6. Then, the parts of the two power supply cables 12, which connect the in-wheel motor 4 and the vehicle body-side power supply unit 14 are respectively fixed to the outer sides of the front link portion 10d and the rear link portion 10e by the power supply cable fixing members 11.

In this manner, in the third embodiment, when wiring two or more power supply cables 12 which connect the in-wheel motor 4 and the vehicle body-side power supply unit 14 to the third link 10, the power supply cables sandwich the shock absorber 8, and are fixed to the front and read link portions 10d, 10e of the third link 10, which are rigid members. Accordingly, it is possible to prevent interference between two thick power supply cables 12 by interposing a shock absorber 8 therebetween. The other configurations and actions are the same as the first embodiment, so the descriptions thereof are omitted.

Next, the effects are described. In the unsprung power supply apparatus B3 for an in-wheel motor vehicle according to the third embodiment, the following effects can be achieved:

(3) The third link 10 is configured so as to support the lower end of the shock absorber 8 in a position that is further on the vehicle body-side than the joint of the steering knuckle 5 (knuckle side coupling point 10a), and comprises a front link portion 10d and a rear link portion 10e so as to sandwich the shock absorber 8 in the longitudinal direction of the vehicle. When there are two or more power supply cables 12, 12 which connect the in-wheel motor 4 and the vehicle body-side power supply cable 14, the power supply cables are respectively fixed to the outer sides of the front link portion and the rear link portion (FIG. 5). Accordingly, in addition to the effects of (1) or (2) above, when two or more power supply cables 12 are arranged, it is possible to prevent interference between the power supply cables 12 by interposing a shock absorber 8 between the power supply cables 12.

Fourth Embodiment

The fourth embodiment is an example in which a measure is taken to prevent a part of the motor-side power supply cable from entering below the third link during steering.

Figure 7:
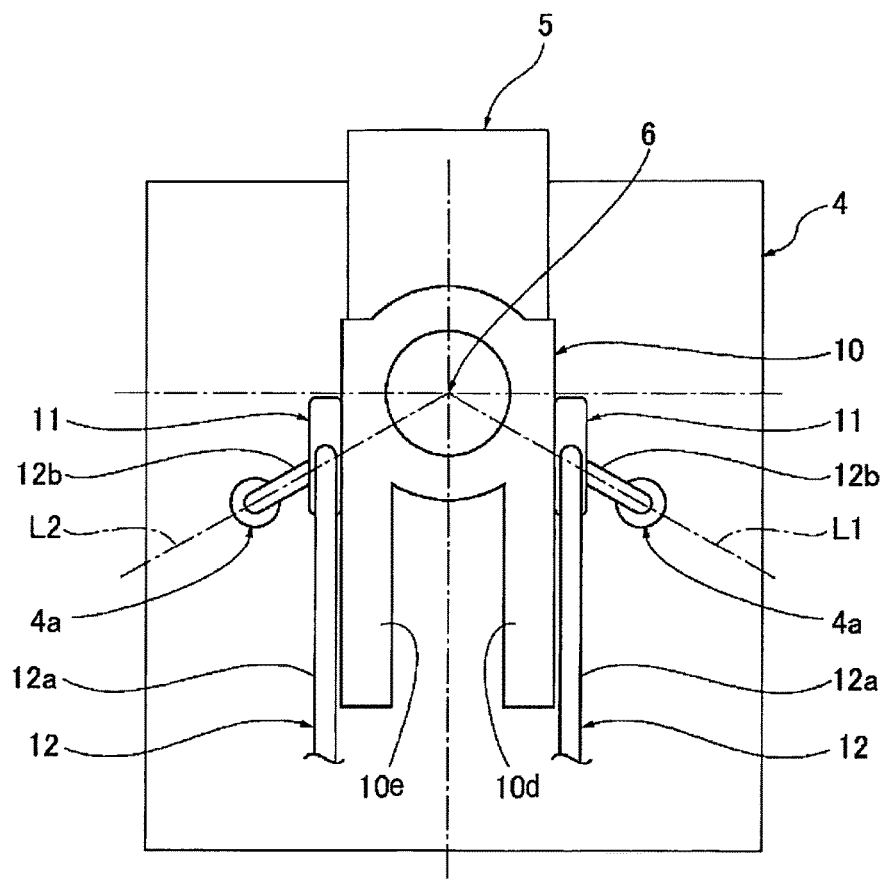
FIG. 7 is a cross sectional view taken along line A-A of FIG. 6, illustrating the positions of the motor power supply terminals in the unsprung power supply apparatus for an in-wheel motor vehicle of a comparative example.
Figure 8:
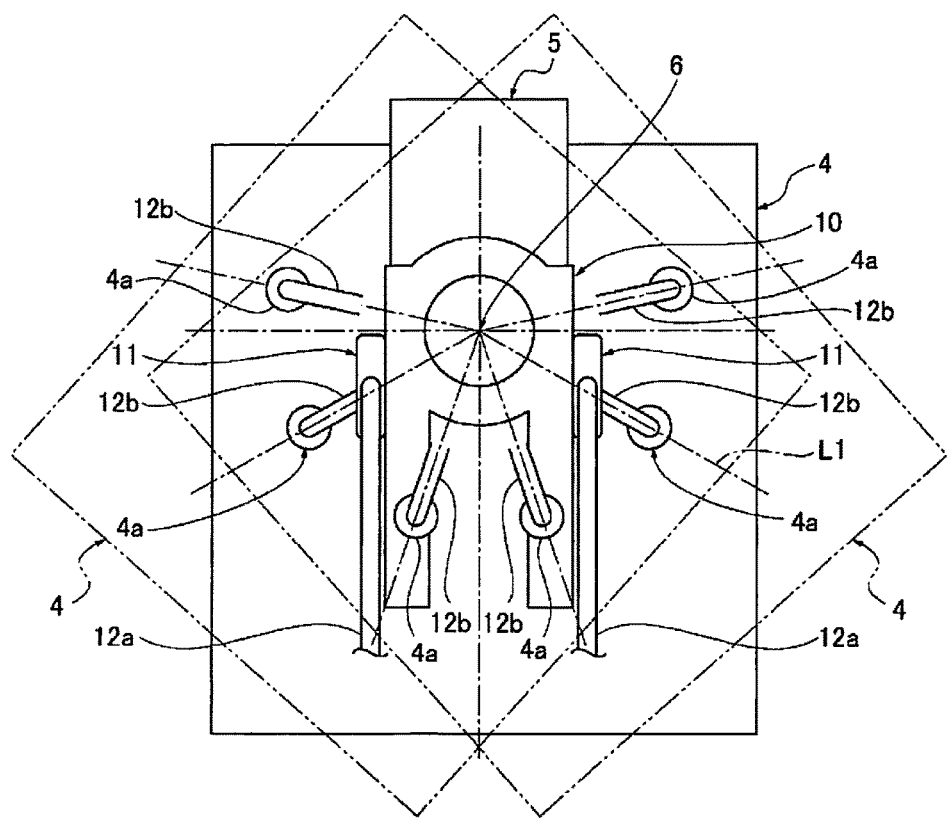
FIG. 8 is a cross sectional view taken along line A-A of FIG. 6, illustrating the positions of the motor power supply terminals corresponding to steering in the unsprung power supply apparatus for an in-wheel motor vehicle of a comparative example.

FIG. 7 illustrates the positions of the motor power supply terminals in the unsprung power supply apparatus for an in-wheel motor vehicle of a comparative example, and FIG. 8 illustrates the positions of the motor power supply terminals corresponding to steering. The problem in an unsprung power supply apparatus for an in-wheel motor vehicle of a comparative example will be described below, based on FIG. 7 and FIG. 8.

In the case of the comparative example, when disposing two power supply cables 12, 12 to the front link portion 10d and the rear link portion 10e of the third link 10, two straight lines L1, L2 that respectively connect the virtual kingpin axis 6 and the two motor power supply terminals 4a, 4a are set, as illustrated in FIG. 7. Then, power supply cable fixing members 11, 11 are respectively provided on the two straight lines L1, L2 in this example.

In the case of this comparative example, when the tire 1 is steered around the virtual kingpin axis 6, the steering knuckle 5, the in-wheel motor 4, and the motor-side power supply cable 12b are integrally steered together therewith. Consequently, a part of the motor-side power supply cable 12b and the motor power supply terminal 4a overlap and enter below the third link 10 during steering, as illustrated in FIG. 8. As a result, when overlapped below the third link 10, it is necessary to avoid interference between the motor-side power supply cable 12b and the in-wheel motor 4, and between the motor-side power supply cable 12b and the third link 10, and thus, an increase in the motor size of the in-wheel motor 4 or a reduction in the size of the third link 10 cannot be expected.

Figure 9:
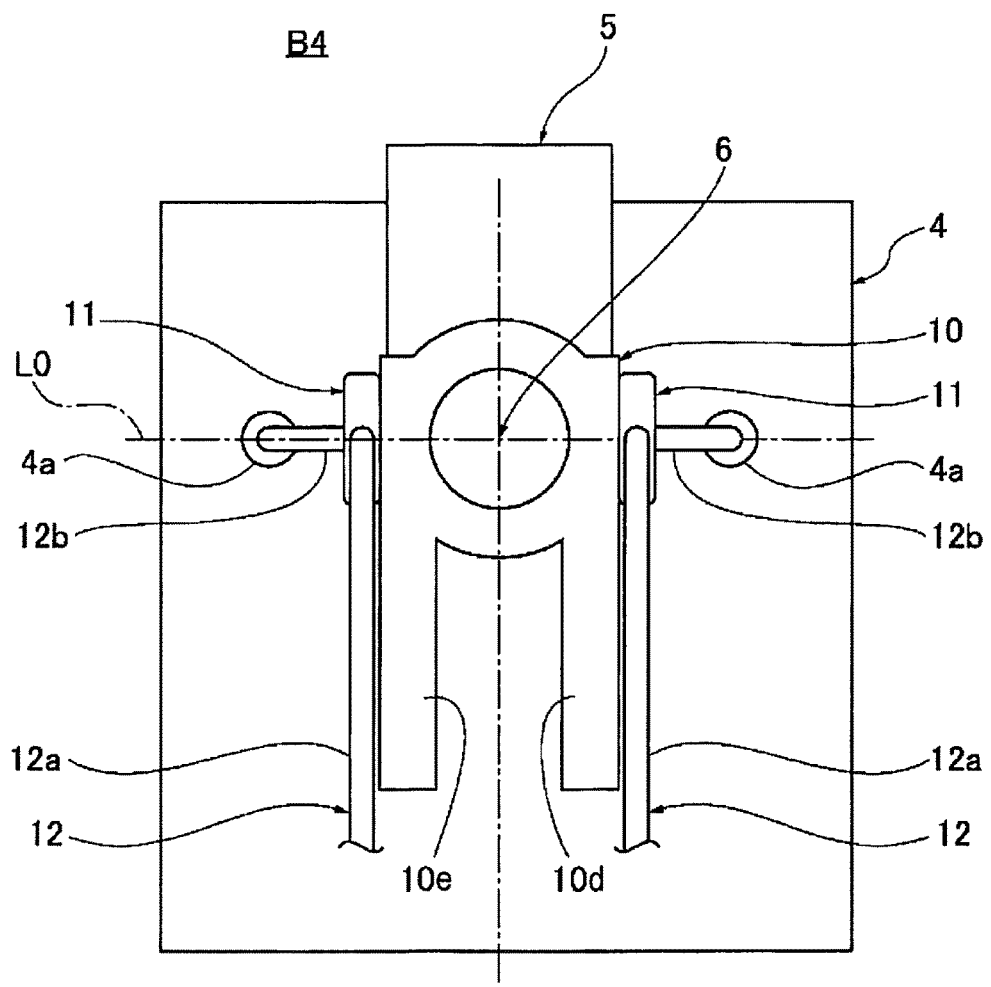
FIG. 9 is a cross sectional view taken along line A-A of FIG. 6, illustrating the positions of the motor power supply terminals in the unsprung power supply apparatus for an in-wheel motor vehicle of a fourth embodiment.
Figure 10:
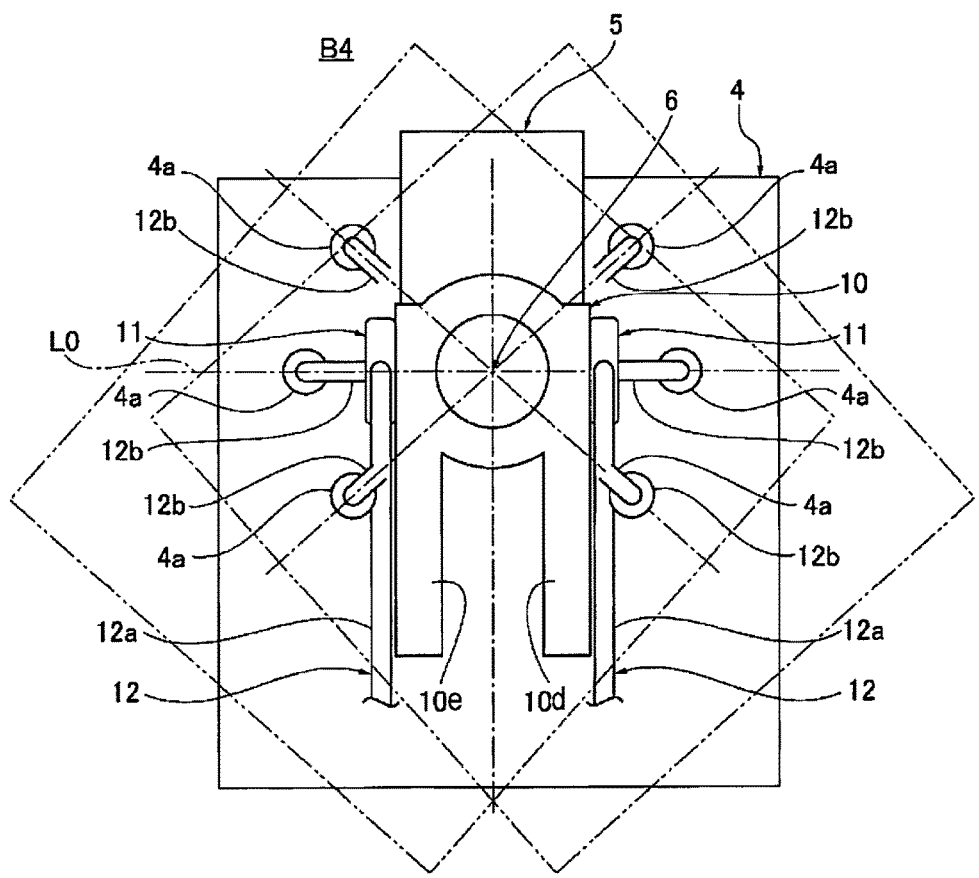
FIG. 10 is a cross sectional view taken along line A-A of FIG. 6, illustrating the positions of the motor power supply terminals corresponding to steering in the unsprung power supply apparatus for an in-wheel motor vehicle of the fourth embodiment.

FIG. 9 illustrates the positions of the motor power supply terminals in the unsprung power supply apparatus B4 for an in-wheel motor vehicle of the fourth embodiment, and FIG. 10 illustrates the positions of the motor power supply terminals corresponding to steering. The configuration and the action of the unsprung power supply apparatus B4 for an in-wheel motor vehicle of the fourth embodiment will be described below, based on FIG. 9 and FIG. 10.

In the unsprung power supply apparatus B4 described above, the parts of the two power supply cables 12 are respectively fixed to the outer sides of the front link portion 10d and the rear link portion 10e by the power supply cable fixing members 11, as illustrated in FIG. 9. When the tire is in a straight state, one straight line that connects the virtual kingpin axis 6 and the two motor power supply terminals 4a, 4a of the in-wheel motor 4 is set as a common axis L0. Then, the two power supply cable fixing members 11, which are fixed to the outer sides of the front link portion 10d and the rear link portion 10e of the third link 10 are configured to be disposed in a position in the vicinity of the common axis L0.

In the case of the fourth embodiment, a part of the motor-side power supply cable 12b and the motor power supply terminal 4a do not overlap and enter below the third link 10 during steering, as illustrated in FIG. 10. As a result, the problem of interferences between the motor-side power supply cable 12b and the in-wheel motor 4, and between the motor-side power supply cable 12b and the third link 10 do not occur, and thus, it is possible to expect an increase in the motor size of the in-wheel motor 4 and a reduction in the size of the third link 10. The other configurations and actions are the same as the first embodiment, so the descriptions thereof are omitted.

Next, the effects are described. In the unsprung power supply apparatus B4 for an in-wheel motor vehicle according to the fourth embodiment, the following effects can be achieved:

(4) When the tire 1 is straight, one straight line that connects the virtual kingpin axis 6 and the two motor power supply terminals 4a, 4a of the in-wheel motor 4 are set as a common axis L0; and the two power supply cable fixing members 11, which are fixed to the outer sides of the front link portion 10d and the rear link portion 10e of the third link 10 are disposed in a position in the vicinity of the common axis L0 (FIG. 9). Accordingly, in addition to the effect of (3) above, it is possible to expect an increase in the motor size of the in-wheel motor 4 and a reduction in the size of the third link 10.

The unsprung power supply apparatus for an in-wheel motor vehicle of the present invention was described above based on the first to fourth embodiments, but specific configurations thereof are not limited to these embodiments, and various modifications and additions to the design can be made without departing from the scope of the invention according to each claim in the Claims.

In the first to fourth embodiments, the unsprung power supply apparatus of the present invention is applied to an in-wheel motor vehicle provided with an upper link, a lower link, a third link, and a shock absorber as suspension members. However, the unsprung power supply apparatus of the present invention can be applied to an in-wheel motor vehicle provided with a suspension having a different linking structure. That is, the device can be applied to any in-wheel motor vehicle that is equipped with a third link that is provided to a knuckle, and that has, as a virtual king-pin axis, an axis that passes through a coupling point with the knuckle.

The invention claimed is:

1. An unsprung power supply apparatus for an in-wheel motor vehicle, the unsprung power supply apparatus comprising:
a steering knuckle for steering a tire of the in-wheel motor vehicle is provided with an in-wheel motor and a link, and a virtual kingpin axis is an axis passing through a coupling point at which the link couples with the steering knuckle and about which the tire is steered, the steering knuckle having an upper end disposed above a wheel axis and a lower end disposed below the wheel axis;

a power supply cable connecting the in-wheel motor and a vehicle body-side power supply unit for wiring, with a part of the power supply cable being fixed to the link; and a lower link connected to the lower end of the knuckle;

the virtual kingpin axis passing through a point at which the lower link is connected to the lower end of the knuckle.

2. The unsprung power supply apparatus according to claim 1, wherein the link is provided with a power supply cable fixing member that fixes the part of the power supply cable; and the power supply cable fixing member is provided in a position on the link in which a distance from the virtual kingpin axis is within a range of a predetermined distance, and in which an amount of change of a relative position with the in-wheel motor is reduced during steering.

3. The unsprung power supply apparatus according to claim 2, wherein the link is configured to support a lower end of a shock absorber in a position that is further on a vehicle body side than a joint with the steering knuckle, and comprises a front link portion and a rear link portion that sandwiches the shock absorber in a longitudinal direction of the vehicle; and when two or more power supply cables are provided which connect the in-wheel motor and a vehicle body-side power supply cable, the power supply cables are respectively fixed to outer sides of the front link portion and the rear link portion.

4. The unsprung power supply apparatus according to claim 3, wherein when the tire is in a straight state, one straight line that connects the virtual kingpin axis and two motor power supply terminals of the in-wheel motor are set as a common axis; and two power supply cable fixing members are fixed to outer sides of the front link portion and the rear link portion of the link at positions in a vicinity of the common axis.

5. The unsprung power supply apparatus according to claim 1, wherein the link is configured to support a lower end of a shock absorber in a position that is further on a vehicle body side than a joint with the steering knuckle, and comprises a front link portion and a rear link portion that sandwiches the shock absorber in a longitudinal direction of the vehicle; and when two or more power supply cables are provided which connect the in-wheel motor and a vehicle body-side power supply cable, the power supply cables are respectively fixed to outer sides of the front link portion and the rear link portion.

6. The unsprung power supply apparatus according to claim 5, wherein when the tire is in a straight state, one straight line that connects the virtual kingpin axis and two motor power supply terminals of the in-wheel motor are set as a common axis; and two power supply cable fixing members are fixed to outer sides of the front link portion and the rear link portion of the link at positions in a vicinity of the common axis.

7. An unsprung power supply apparatus for an in-wheel motor vehicle, the unsprung power supply apparatus comprising:

a steering knuckle for steering a tire of the in-wheel motor vehicle is provided with an in-wheel motor and a link, and a virtual kingpin axis is an axis passing through a coupling point at which the link couples with the steering knuckle, the steering knuckle having an upper end disposed above a wheel axis and a lower end disposed below the wheel axis; and a power supply cable connecting the in-wheel motor and a vehicle body-side power supply unit for wiring, with a part of the power supply cable being fixed to the link;

the link being configured to support a lower end of a shock absorber in a position that is further on a vehicle body side than a joint with the steering knuckle, and comprising a front link portion and a rear link portion that sandwiches the shock absorber in a longitudinal direction of the vehicle; and when two or more power supply cables are provided which connect the in-wheel motor and a vehicle body-side power supply cable, the power supply cables are respectively fixed to outer sides of the front link portion and the rear link portion.

8. An unsprung power supply apparatus for an in-wheel motor vehicle, the unsprung power supply apparatus comprising:

a steering knuckle for steering a tire of the in-wheel motor vehicle is provided with an in-wheel motor and a link, and a virtual kingpin axis is an axis passing through a coupling point at which the link couples with the steering knuckle, the steering knuckle having an upper end disposed above a wheel axis and a lower end disposed below the wheel axis; and a power supply cable connecting the in-wheel motor and a vehicle body-side power supply unit for wiring, with a part of the power supply cable being fixed to the link;

the link being provided with a power supply cable fixing member that fixes the part of the power supply cable, the link being configured to support a lower end of a shock absorber in a position that is further on a vehicle body side than a joint with the steering knuckle, and comprising a front link portion and a rear link portion that sandwiches the shock absorber in a longitudinal direction of the vehicle;

the power supply cable fixing member being provided in a position on the link in which a distance from the virtual kingpin axis is within a range of a predetermined distance, and in which an amount of change of a relative position with the in-wheel motor is reduced during steering; and when two or more power supply cables are provided which connect the in-wheel motor and a vehicle body-side power supply cable, the power supply cables are respectively fixed to outer sides of the front link portion and the rear link portion.

* * * * *